Dec. 8, 1964 C. J. FULLER 3,160,761
THEFT PREVENTION FOR AUTOMOBILES AND THE LIKE
Filed Aug. 4, 1960
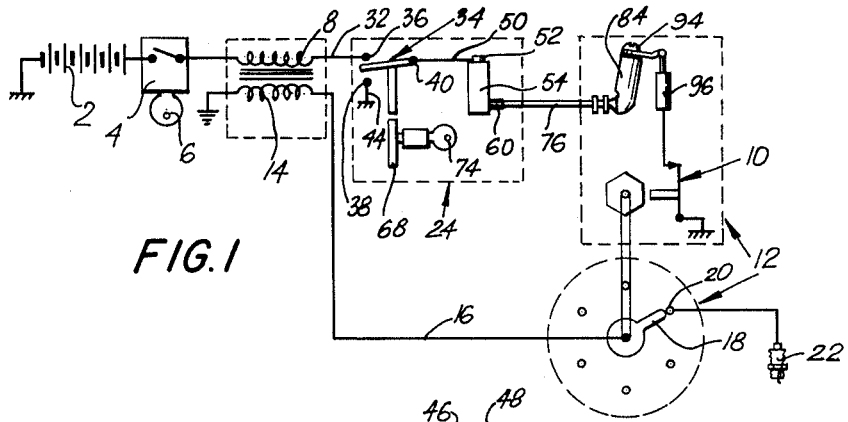
FIG. 1
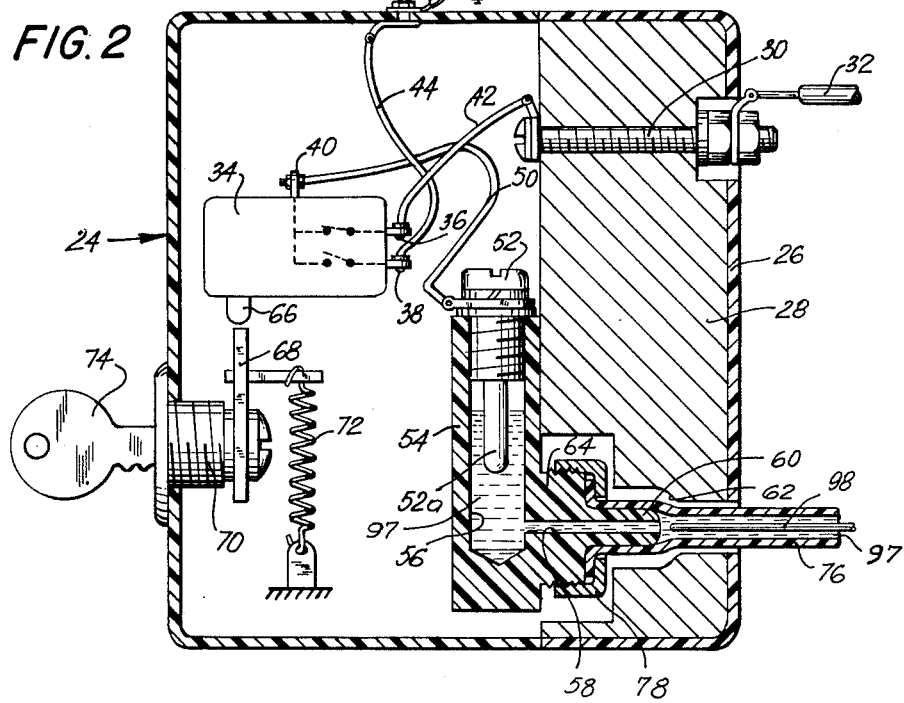
FIG. 2
FIG. 3
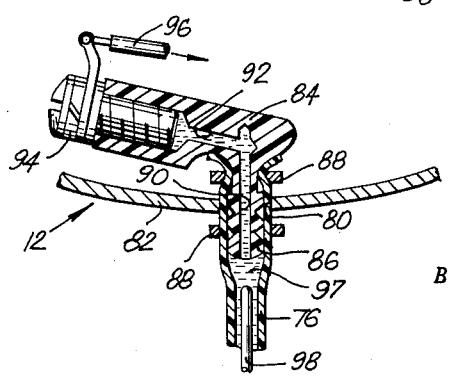
INVENTOR.
CLIFFORD J. FULLER
BY
James and Franklin
ATTORNEYS

United States Patent Office 3,160,761
Patented Dec. 8, 1964

3,160,761
THEFT PREVENTION FOR AUTOMOBILES
AND THE LIKE
Clifford J. Fuller, 252 St. Nicholas Ave., Brooklyn, N.Y.
Filed Aug. 4, 1960, Ser. No. 46,624
8 Claims. (Cl. 307—10)

The present invention relates to means for preventing the circumvention of an open-circuit locking device in an electrical circuit, and is particularly applicable to the prevention of theft of automobiles and other vehicles having ignition systems.

The theft of automobiles is a major problem today, primarily because the theft-prevention means with which vehicles are customarily provided is totally inadequate to prevent theft by a person with proper mechanical knowledge and a limited amount of appropriate equipment. Primarily the sole theft-prevention means in a modern automobile comprises a switch in the ignition circuit which may be locked in circuit-open position. However, it is an easy matter for one with the requisite skill to circumvent the locked ignition switch and drive a car away, as by attaching a "jumper" wire between appropriate points in the ignition circuit exposed beneath the hood of the car.

It is a prime object of the present invention to so construct a lockable electrical circuit, and particularly the ignition circuit of a vehicle, that theft is virtually impossible, and the use of a "jumper" wire is rendered ineffectual. In accordance with the present invention this can be done either by means of original equipment to be substituted for the conventional ignition switch or by means of an accessory attachment which may be used in addition to the convention ignition switch. The latter is here specifically illustrated by way of example.

According to one aspect of the present invention a portion of the ignition circuit which is controlled by a lock-actuated switch includes electrical connection means extending between two stations in the ignition circuit which comprises a confined continuous strip of conductive fluid, such as mercury. More specifically, the conductor in question may comprise a tubular member of non-conductive material within which the continuous strip of conductive fluid is contained. If a would-be thief were to attempt to connect into the ignition circuit by forcing a "jumper" wire through the tubular member to the conductor contained therein, the conductive fluid would leak out through the hole made in the tubular member by the "jumper" wire, thus interrupting the continuity of the electrical circuit and causing the car to come to a standstill.

In order to prevent electrical connection to be made directly to the terminals at the stations between which the conductive fluid extends, those terminals are mounted inside structural elements which may be difficult or practically impossible to open, connection between those terminals and the outsides of the structural elements within which they are mounted being accomplished by means of a tortuous passage substantially filled with conductive fluid. If an attempt is made to insert a wire through those passages in order to reach the terminals with which they connect, the tortuosity of the passages will prevent the wire from reaching the terminal, and the leakage of the conductive fluid formerly contained within the passages will again destroy the continuity of the electrical circuit.

One of the structural elements which carries such a terminal may comprise a permanently closed lockout housing within which a lock-actuated switch is mounted. When that switch is actuated to open-circuit condition the ignition circuit will be interrupted and it will, as a practical matter, be virtually impossible to provide a switch-circumventing electrical path around the switch because of the use of a conductive fluid in the ignition circuit as aforesaid. As an additional safety feature, the switch, when in open-circuit condition, may actually ground the operative portion of the ignition circuit so that even if a "jumper" is successfully connected around the lockout the motor will still not operate.

The tube which contains the conductive fluid may resemble an ordinary wire conductor in appearance, so that a would-be thief who attempted to use a "jumper" in conventional fashion would be trapped into rendering the car incapable of movement under its own power. Even if the would-be thief recognized the tube for what it was—a conduit for a continuous strip of conductive fluid—he would know that he could not, without such radical actions as would in most cases be impossible under the circumstances, circumvent the locking system, and he would make no attempt to steal that particular vehicle. He would look for "easier pickings." In either event actual theft of the vehicle would be effectively prevented.

To the accomplishment of the above, and to such other objects as may hereinafter appear, the present invention relates to means for preventing the circumvention of an open-circuit locking device in an electrical circuit, as defined in the appended claims, and as described in this specification, taken together with the accompanying drawings in which:

FIG. 1 is a schematic circuit diagram of a typical ignition circuit for an internal combustion engine, the device of the present invention being shown employed in addition to the ignition swtch;

FIG. 2 is a cross-sectional view of one embodiment of lockout structure made in accordance with the present invention; and FIG. 3 is a cross-sectional view indicating the manner in which electrical connection may be made, in accordance with the present invention, to a station in the ignition circuit other than the lockout housing, such as the distributor housing.

A conventional ignition circuit for an internal combustion engine comprises, as is shown in FIG. 1, a battery 2 connected by an ignition switch 4, adapted to be controlled by a key 6 to one end of a primary winding 8 of an ignition coil, the other end of that winding 8 being connected in any appropriate manner to a timed circuit-breaker generally designated 10 and normally located within the housing of a distributor generally designated 12. The secondary winding 14 of the ignition coil is connected by a lead 16 to a rotating arm 18 within the distributor housing 12, that arm successively making engagement with the spaced contacts 20 which are electrically connected to spark plugs 22. The security of this conventional circuit depends exclusively upon the security of the ignition switch 4, and all that is necessary to steal a car thus equipped is to connect one end of a "jumper" wire to a point between the battery 2 and the switch 4 and to connect the other end of the "jumper" wire to a point between the switch 4 and the primary ignition coil winding 8. To one who is familiar with the electrical circuitry of automobiles it is easy to recognize or to trace the required wires, to pierce the insulation thereof, and to make electrical connection thereto.

In accordance with the present invention I provide in the ignition circuit, and as here specifically disclosed between the primary winding 8 of the ignition coil and the distributor 12, a lockout generally designated 24. This lockout comprises a housing 26 formed of any suitable sturdy structural material, preferably insulating in nature, the parts of which are secured together in any appropriate manner so as to prevent the ready separation thereof, thereby preventing access to the interior thereof. Within the housing 26 is a base 28 through which terminal screw 30 extends to the exterior of the housing 26, where it is adapted to be connected to lead 32 which extends to the primary winding 8. Also mounted within the housing 26 is a switch 34 having three terminals 36, 38 and 40. The lead 42 connects terminal 36 to terminal screw 30. The lead 44 connects terminal 38 to terminal screw 46 which passes through the housing 26 and, via lead 48, is connected to ground. Lead 50 connects terminal 40 to terminal pin 52 which is threadedly received within housing 54, that housing having a central passage 56 which communicates with a passage 58 formed in a laterally extending part 60 which extends into an opening 62 formed in the base 28 and communicating with the exterior of the casing 26. The part 60 is provided, adjacent the housing 54, with an externally threaded portion 64 of enlarged diameter. The pin portion 52a of the terminal pin 52 extends into the passage 56 but terminates well short of the passage 58, as is clearly shown in FIG. 2.

The switch 34 is provided with an actuating button 66 adapted to be actuated by cam 68 controlled by lock 70, spring 72 biasing the cam 68, as here shown, out of engagement with the button 66, thereby causing the internal electrical connections within the switch 34 to assume the condition shown in FIG. 2, completing an electric circuit between the terminals 36 and 40 and thus completing the continuity of the circuit through the lockout 24. Rotation of the lock 70 by means of the key 74 will, however, reverse those connections so that terminals 38 and 40 are connected and the circuit terminal 36 is disconnected from the circuit. Preferably, the actuating element 68 will remain in that latter position, against the biasing action of the spring 72, only when the key 74 is removed from the lock 70.

Connection between the terminal 52 and the distributor 12 is made by means of tube 76, one end of which passes through the opening 62 in the housing 26 and base 28 and is received over the nipple-like smaller diameter portion of the housing part 60, being there retained by means of a nut 78 threadedly received over the larger diameter portion 64 of the housing part 60. The tube 76 may be formed of any suitable non-conductive and relatively impermeable material, such as nylon, or, if desired, it may be formed in several layers as requirements of strength, resistance to corrosion and abrasion, and the like may dictate. The interior of the tube 76, it will be noted, communicates with the passages 58 and 56 in the terminal housing 54.

The other end of the tube 76 extends to the distributor 12 and (see FIG. 3) passes through the aperture 80 in the wall 82 of the distributor housing. A terminal housing 84, formed of suitable non-conductive material, is mounted within the housing of the distributor 12 and has a nipple-like portion 86 which projects out through the housing wall 82, the end of the tube 76 being received thereover and being sealed thereto in any appropriate manner, as by means of the snap rings, clamps, or the like 88. The portion 86 is provided with a passage 90 communicating with the interior of the tube 76 at one end and communicating at its other end with a passage 92 extending off at an angle thereto inside the terminal housing 84, the passage 92 extending up to the terminal screw 94 threadedly received within the housing 84 and electrically connected, by means of a lead 96, to one of the contacts of the timed circuit breaker 10.

The tube 76, as well as the passages 56 and 58 in the terminal housing 54 and the passages 90 and 92 in the terminal housing 84, are adapted to be substantially filled with a conductive fluid 97. Mercury is preferred for this purpose because of its high conductivity, its lack of chemical interaction with the terminals 52 and 94, and its ability to escape readily through very small openings. Hence a continuous column of this conductive fluid 97 will extend from the terminal 52 to the terminal 94, and this continuous column of conductive fluid will constitute the electrical connection between those terminals. The joints between the terminal 52 and its housing 54, the terminal 94 and its housing 84, and the tube 76 and the terminal housings 54 and 84, will all be sufficiently tight so as to retain the conductive fluid in place and prevent any leakage. It is not essential that the passages 56, 58, 76, 90 and 92 be completely filled with conductive fluid; the elongated nature of the pin portion 52a of the terminal 52 will maintain electrical connection between that terminal and the conductive fluid despite slight variations in the height of the conductor fluid column within the passage 56. A similar pin-type terminal construction could be employed for the terminal screw 94 if desired.

In order to prevent conductive discontinuities within the tube 76 in the event of vibration, or if the tube should be bent, a conductive wire 98 may extend through the tube 76, and may be freely mounted within the interior thereof. The ends of this wire 98 terminate short of the terminals 52 and 94, from which it will be apparent that electrical connection between those terminals requires the presence of the column of conductive fluid. The purpose of the wire 98 is merely to prevent temporary circuit discontinuities along the length of the tube 76.

With the lockout 24 in its normal condition such as is shown in FIG. 2, with the terminals 36 and 40 connected to one another, the primary of the ignition circuit may be traced through the ignition switch 4, the primary ignition coil winding 8, the terminal 30, the lead 42, the terminal 36, the terminal 40 and the lead 50 to the terminal 42, and from there, via the continuous column of conductive fluid 97 contained within the passages 46, 58, 76, 90 and 92, to the terminal 94, lead 96, and circuit breaker 10. The ignition switch 4 will therefore control the ignition circuit in conventional fashion, and there will be no drain on the battery when the ignition switch 4 is open.

When, however, the condition of the switch 34 is altered from that shown in FIG. 2, connecting the terminals 38 and 40, and disconnecting the terminal 36 from the circuit, two results are obtained. In the first place the ignition circuit is interrupted, so that it will not function whether the ignition switch 4 is on or off. In the second place the electrical connection to the circuit breaker 10 is grounded. With the lockout in this open-circuit condition, therefore, there will be no drain on the battery 2 even when the ignition switch 4 is closed. Moreover, even if electrical connection is made externally, by a would-be thief, around the lockout 24 the ignition circuit still will not function because it is grounded.

More significantly, it will, as a practical matter, be so difficult to make an external electrical connection around the lockout 24, as to render that operation highly impractical. Any attempt to accomplish this electrical connection by penetrating the tubing 76 will be self-defeating, whether or not the wire 98 is provided within the tube 76, because the very penetration of the tube 76 will provide a means for escape of the conductive fluid 97, no matter how carefully the penetration may be accomplished, and as the conductive fluid 97 leaks out the continuity of electrical connection between the terminals 52 and 94 will be destroyed. If such leakage takes place quickly the car will never start. Even if it takes place slowly the car will soon come to a halt and will have to be abandoned far from the goal of the thief. Since the tube 76 may well have an external appearance indistinguishable from that of conventional wire conductors, and may even have a "fuel" indistinguishable from such conductors, particularly if the wire 98 is contained therein, there will be nothing to apprise the unsophisticated thief of the fact that the use of normal "jumper" wire techniques willl be self-defeating.

Once the conductive fluid has drained away, an effective ignition system is beyond recall. Even if the thief should properly diagnose the trouble and should remove the tube 76 and attempt to restore electrical connection between the terminals 52 and 94 by conventional means, he will not be able to do so. If he tried to force a wire through the passage 58 or the passage 90 that wire would never reach the terminals 52 or 94 respectively, because of the tortuosity of the composite passages 58, 56 and 90, 92 respectively. Conductive fluid in those passages is required, as a practical matter, in order to make electrical connection with those terminals.

All the thief could do is attempt to make direct electrical connection with the terminals 52 and 94 inside the casings in which they are mounted. The casing 26 of the lockout may be specially designed to prevent disassembly of its various parts and may be sufficiently tough to resist all but the most heroic efforts at breaking in. Moreover, the lockout may be mounted on the vehicle in an inaccessible or unobtrusive location. Insofar as the housing of the distributor 12 is concerned, in modern cars it is already located relatively inaccessibly, and, depending upon the degree of anti-theft security desired, the distributor housing could readily be modified in many ways so as to make its disassembly difficult or impractical except under shop conditions where ample time and facilities are available. Such modifications to the distributor housing to prevent unauthorized opening thereof would cause little inconvenience to a car owner, but would cause great inconvenience to a would-be thief, who usually must work rapidly and unobtrusively in order to effectuate his ends.

Use of the lockout here disclosed as an accessory in already existing automobile ignition systems is entirely practical, and will not affect the functioning of that ignition system nor any of the auxiliary electrical circuits, such as those which control lights, radio, heater, starting motor and the like. It also may be provided as original equipment, to be substituted for the conventional ignition switch 4.

With the system of the present invention great obstacles are placed in the path of a would-be thief. The design is such as not to give away its special characteristics except to the most experienced and sophisticated eye. When the system of the present invention is used in addition to the standard ignition switch, a car thief must overcome both systems before he can start the engine. A false movement on the part of the thief will result in loss of the conductive fluid which connects the lockout to the distributor and thus will, for all practical purposes, prevent the thief from reestablishing a working ignition circuit.

While but a single embodiment of the present invention has been here disclosed, it will be apparent that many variations may be made therein, both as to operative structure and location within the appropriate electrical circuit, all without departing from the spirit of the invention, as defined in the following claims.

I claim:

1. A lockout adapted to be connected in an automobile ignition circuit between first and second stations therein, said lockout comprising a housing, a switch therein adapted to be actuated between first and second conditions and locked in said second condition, said switch in its first condition closing the circuit between said stations and in its second condition opening the circuit between said stations, and an electrical connection in part external of said housing between said switch and one of said stations, said electrical connection comprising at least in part a tubular member of non-conductive material extending from said housing toward said one of said stations and containing a continuous strip of conductive fluid, the ends of said strip being electrically connected respectively to said switch and to said one of said stations, and a conductive filament extending along and inside said tublar member in contact with said conductive fluid, said filament being electrically connected to at least one of said switch and said one of said stations only via conductive fluid.

2. A lockout adapted to be connected in an automobile ignition circuit comprising a primary winding of an ignition coil and a distributor, said lockout comprising a housing, a switch therein adapted to be actuated between first and second conditions and locked in said second condition, electrical connections between said switch on the one hand and ground, said primary, and said distributor respectively on the other hand, said switch in its first condition connecting said distributor to said primary winding, said switch in its second condition connecting said distributor to ground, said electrical connection between said lockout housing and said distributor comprising at least in part, and in part exteriorly of said lockout housing, a tubular member of non-conductive material extending from said housing toward said distributor and containing a continuous strip of conductive fluid, the ends of said strip being electrically connected respectively to said switch and said distributor.

3. In the lockout of claim 2, a conductive filament extending along and inside said tubular member in contact with said conductive fluid, said filament being electrically connected to at least one of said switch and said distributor only via said conductive fluid.

4. The lockout of claim 2, in which at least one of said lockout and distributor comprises an interiorly located non-conductive element extending to the exterior thereof and having a passageway therein communicating witht said exterior, terminal means electrically connected in said ignition circuit and exposed at the interior of said passageway, said passageway containing conductive fluid in contact with said terminal means and in communication with said continuous strip of conductive fluid in said tubular mmeber to define a continuous line of conductive fluid.

5. The lockout of claim 4, is which said passageway is tortuous in shape, thereby to inhibit the making of unauthorized electrical connection with said terminal means by the insertion of a wire therethrough.

6. In an automobile ignition system comprising first and second separated terminals and an electrical connection therebetween, the improvement which comprises said electrical connection comprising at least in part a tubular member of non-conductive material containing a continuous strip of conductive fluid, and a conductive filament extending along and inside said tubular member in contact with said conductive fluid, said filament at the end thereof corresponding to one of said terminals being spaced from said terminal and electrically connected thereto only via said conductive fluid, the other end of said continuous strip of conductive fluid being electrically connected to the other of said terminals.

7. A lockout adapted to be connected in an automobile ignition circuit between first and second stations therein, said lockout comprising a housing, a switch therein adapted to be actuated between first and second conditions and locked in said second condition, said switch in its first condition closing the circuit between said stations and in its second condition opening the circuit between said stations, and an electrical connection external of said housing between said switch and one of said stations, said electrical connection comprising at least in part a tubular member of non-conductive material extending in part between said housing and said one of said stations and containing a continuous strip of conductive fluid, the ends of said strip being electrically connected respectively to said switch and to said one of said stations, at least one of said lockout and said one of said stations comprising an interiorly located non-conductive element extending to the exterior thereof and having a pasageway therein communicating with said exterior, terminal means electrically connected in said ignition circuit and exposed at the interior of said passageway, said passageway containing conductive fluid in contact with said terminal means and in communication with said continuous strip of conductive flud in said tubular member to define a continuous line of conductive fluid.

8. In an automobile ignition system comprising first and second separated terminals and an electrical connection therebetween, the improvement which comprises said electrical connection comprising at least in part a confined continuous strip of conductive fluid, at least one of said terminals being mounted inside a housing and communicating with the outside of said housing via a passageway formed in a non-conductive element, said passageway containing conductive fluid in direct physical communication with the conductive fluid of said confined continuous strip so as to define a continuous line of conductive fluid providing for electrical connection between said one of said terminals and a point spaced from said terminal to which said confined continuous strip of conductive fluid extends, said passageway extending between said one of said terminals and the exterior of said housing and being tortuous in shape, thereby to inhibit the making of unauthorized electrical connection with said one of said terminals by the insertion of a wire therethrough.

References Cited by the Examiner

UNITED STATES PATENTS

| | | | |
|---|---|---|---|
| 730,847 | 6/03 | Gilder et al | 174—9.5 |
| 1,719,539 | 7/29 | Fought et al. | 307—10 X |
| 2,650,989 | 9/53 | Heath | 307—10 |

LLOYD McCOLLUM, *Primary Examiner.*

MILTON O. HIRSHFIELD, *Examiner.*